March 22, 1960    H. J. STARK ET AL    2,929,754
SELF-CURING THERMOPLASTIC REPAIR MEANS
Filed Oct. 7, 1955
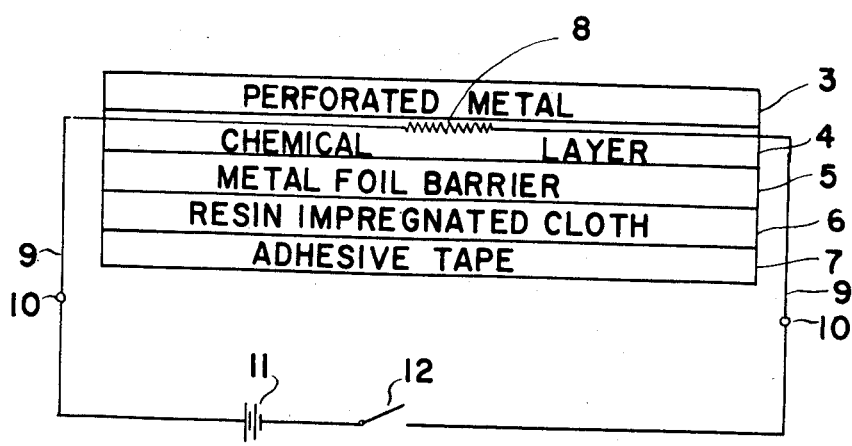
INVENTORS
HOWARD J. STARK
JOHN B. ALFERS
FRANK E. COOK
BY *George Sipkin*
*B. L. Zangarell*
ATTORNEYS United States Patent Office 2,929,754
Patented Mar. 22, 1960

2,929,754

SELF-CURING THERMOPLASTIC REPAIR MEANS

Howard J. Stark, Arlington, John B. Alfers, North Arlington, and Frank E. Cook, Arlington, Va.

Application October 7, 1955, Serial No. 539,295

7 Claims. (Cl. 154—46)

(Granted under Title 35, U.S. Code (1952), sec. 266)

The invention described herein may be manufactured and used by or for the Government of the United States of America for governmental purposes without the payment of any royalties thereon or therefor.

This invention relates to adhesive tape or sheet repair material; and more particularly to a composite tape including a layer of a thermosetting plastic or resin and a chemical layer having exothermic properties; and specifically to a thermosetting resin, adhesive tape having a chemical therein that can be caused to exothermically decompose to produce an amount of heat required to start and complete the cure of the thermosetting resin, whereby bonding to a surface to be repaired will be accomplished.

Heretofore the method of obtaining heat to cure or polymerize thermosetting resins whereby adhesion was effected between the resin and a surface to be repaired was through the use of heat from an oven, electrical heaters external to the resin, and other various external sources. For the purpose specifically contemplated by this invention, namely, as an emergency battle repair device for plastic and/or metal naval equipment such as pipe, boat hulls, valves, and other items of equipment, the disadvantages of the old methods are obvious in that they required a long time to effect the repairs. Further, these external heat sources produced flaming, charring and even visible burning of the surfaces to be required.

This invention utilizes a laminar composite tape or sheet repair material which includes a resin in combination with chemicals from which a controlled amount of heat can be derived from the exothermic properties specifically characteristic of the chemicals described herein. The exothermic reaction is initiated by sending a current through a short length of heated fine resistance wire embedded in the exothermic chemical thereby causing a spot of highly concentrated heat which acts like a fuse to cause decomposition or reaction of the chemical material. The heat liberated by the decomposed chemical is utilized to polymerize the resin and thereby produce a solid bond with the material to be repaired.

Therefore, an object of the present invention is to provide a rapid method of repairing plastic and/or metal equipment.

Another object of the present invention is to provide a self-starting, self-curing tape or sheet material for use in the repair of plastic and/or metal surfaces.

A further object is to provide a tape containing a thermosetting resin, the tape containing a means providing a controllable amount of potential heat, the means being in the form of a chemical having exothermic properties.

A further object of this invention is the provision of chemicals having exothermic properties in combination with thermosetting materials which will facilitate the polymerization of the materials.

Still another object is the provision of a thermosetting tape of a type described containing electrical means for initiating a chemical reaction therein which has exothermic properties, whereby polymerization of the thermosetting resin in the tape may be accomplished.

Other objects and many of the attendant advantages of this invention will be readily appreciated as the same becomes better understood by reference to the following detailed description when considered in connection with the accompanying drawing wherein the figure is a longitudinal sectional enlarged view of a tape embodying the invention.

Referring now to the drawing which illustrates a preferred embodiment there is shown in the figure a tape having a laminar construction, exaggerated for purposes of description. Preferably the layers should be as thin as possible in order that high bonding strengths may be obtained. The tape comprises a perforated or screen layer 3 of metal or other suitable material, a chemical layer 4 having exothermic properties, a flexible film layer or metal foil barrier 5, a polymerizable resin layer 6 and a strippable pressure sensitive adhesive tape layer 7.

The chemicals utilized in the chemical layer 4 may be any suitable organic hydrogen containing chemical compound. Examples of suitable compounds, usually in the form of powders, used were pp' oxy bis (benzene sulfonyl hydrazide) and other chemicals such as benzene sulfonyl hydrazide, pp' oxy bis (biphenyl sulfonyl hydrazide). These chemicals are pressed or packed closely together and are held in place with substantially 10% of an inert polymer setting binder such as casein, resorcinol formaldehyde, or any uncured rubber base cement. Embedded in the chemical layer 4 is a short length of high resistance wire 8 having external leads 9. The purpose of the layers 3 and 5 which are held in spaced relationship by the inert polymer setting binder in layer 4 is to substantially confine the heat liberated by the decomposing chemical. Layer 3 is perforated to enable gases due to decomposition and also some heat to escape to prevent blistering, thereby enabling the chemical to decompose evenly throughout. Hence, the application of heat to the thin layer 5 is uniform and the major portion of the heat generated will be conducted therethrough to the resin layer 6.

Resinous layer 6 may be a glass cloth or the like impregnated with catalyzed and promoted resins; for example, the resin can be composed of almost any ester or mixtures of esters of dibasic acids and polyhydric alcohols, catalyzed with an organic peroxide and promoted with inorganic maleates or naphthenates. This layer 6 is tacky and adheres to layer 5. Such resins are obtainable under the trade names of Laminac, furnished by the American Cyanamid Company of Stamford, Connecticut, Selectron resins, furnished by the Pittsburgh Plate Glass Company, and vibrin resins, furnished by the Naugatuck Chemical Company. The adhesive tape layer 7 is a protective layer whereby contamination of the resin impregnated material is minimized during storage.

The making of a repair consists of wrapping the tape or sheet material of the construction described or holding it in place over a damaged area to be repaired, after removal of the protective layer 7. Leads 9 are then connected to terminals 10 of a power source 11. Upon closure of a switch 12, current flows through the high resistance wire 8 and causes it to heat in accordance with the relation, heat=current squared×resistance× time. Hence, a spot of highly concentrated heat is substantially instantaneously applied to the chemical immediately adjacent the wire. Decomposition or reaction of the chemical starts and the heat of decomposition or reaction is transmitted through layer 5 and thereafter is utilized to polymerize the resin layer 6. The heat liberated is sufficient to start and complete the cure of the resin to form a solid bond. Thereafter layers 3 and 4 are sloughed off.

The chemical heat is produced without flaming, charring, red-heat embers or any other evidence of visible burning. It will not produce combustion of adjacent combustible materials such as styrene containing polymer setting resins. Hence, the usefulness of these chemicals in the polymerization of resinous materials adapted for the repair of shipboard pipe, machinery, and other equipment is apparent.

Obviously many modifications and variations of the present invention are possible in the light of the above teachings. It is therefore to be understood that within the scope of the appended claims the invention may be practiced otherwise than as specifically described.

What is claimed is:

1. An article of manufacture comprising a laminated tape for repairing holes in surfaces of materials, said tape comprising a plurality of layers, said layers comprising a top layer of perforated material, a heat-conducting metallic layer and a normally unreacted exothermically reacting chemical layer between said top layer and said metallic layer, said tape comprising an electric resistor in said chemical layer having conductors extending therefrom adapted to be connected to a source of electric energy, said layers of said tape also comprising a tacky thermosetting plastic layer adjacent said metallic layer on the side thereof opposite said chemical layer, said plastic layer sticking to said surface upon curing under heat of said chemical layer.

2. An article as defined in claim 1 wherein said plastic layer consists essentially of the equivalent of a cloth impregnated with a catalyzed and promoted resin.

3. An article as defined in claim 2 wherein said chemical layer consists essentially of the equivalent of benzene sulfonyl hydrazide in a binder, said binder being a minor constituent of said chemical layer.

4. An article as defined in claim 3 wherein said binder is an uncured rubber base cement.

5. An article of manufacture comprising a laminated tape for repairing a hole in the surface of a material, said tape comprising a plurality of layers, said layers comprising a heat-conducting metallic layer, a normally unreacted, exothermically reacting chemical layer adjacent said metallic layer, and a tacky thermosetting plastic layer adjacent said metallic layer on the side opposite said chemical layer, and an electric resistor having conductors adapted to be connected to a source of electric power, said resistor being arranged to deliver heat to said chemical layer for starting the exothermic reaction of said chemical layer, whereby the heat thereof cures said plastic layer, the cured plastic layer sticking to said material.

6. An article of manufacture comprising a laminated tape for repairing a hole in the surface of a material, said tape comprising a plurality of layers, said layers comprising a heat-conducting metallic layer, a normally unreacted, exothermically reacting chemical layer adjacent said metallic layer, and a tacky thermosetting plastic layer adjacent said metallic layer on the side opposite said chemical layer, and an electric resistor having conductors adapted to be connected to a source of electric power, said resistor being arranged to deliver heat to said chemical layer for starting the exothermic reaction of said chemical layer, whereby the heat thereof cures said plastic layer, the cured plastic layer sticking to said material, said plastic layer consisting essentially of the equivalent of a cloth impregnated with a catalyzed and promoted resin.

7. An article of manufacture as defined in claim 6 wherein said chemical layer consists essentially of the equivalent of benzene sulfonyl hydrazide in a binder.

References Cited in the file of this patent

UNITED STATES PATENTS

| | | |
|---|---|---|
| 1,960,137 | Brown | May 22, 1934 |
| 2,372,929 | Blessing | Apr. 3, 1945 |
| 2,458,032 | Simon et al. | Jan. 4, 1949 |
| 2,492,568 | Gillis | Dec. 27, 1949 |
| 2,496,911 | Green | Feb. 7, 1950 |
| 2,566,802 | Kennelly | Sept. 4, 1951 |
| 2,750,320 | Latham | June 12, 1956 |
| 2,774,421 | Lion | Dec. 18, 1956 |
| 2,793,177 | Fourier | May 21, 1957 |
| 2,804,416 | Phillipsen | Aug. 27, 1957 |
| 2,852,423 | Bassett | Sept. 16, 1958 |

OTHER REFERENCES

Serial No. 229,798, Baseler et al. (A.P.C.), published May 11, 1943.

Hackh's Chemical Dictionary, Grant, 3rd edition, pages 845 and 846.